United States Patent
Klauss et al.

(10) Patent No.: US 12,487,632 B2
(45) Date of Patent: Dec. 2, 2025

(54) METHOD FOR OPERATING A DATA PROCESSING SYSTEM

(71) Applicant: Robert Bosch GmbH, Stuttgart (DE)

(72) Inventors: Michael Klauss, Backnang (DE); Rainer Baumgaertner, Pfaffenhofen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 187 days.

(21) Appl. No.: 18/536,499

(22) Filed: Dec. 12, 2023

(65) Prior Publication Data
US 2024/0201732 A1 Jun. 20, 2024

(30) Foreign Application Priority Data
Dec. 20, 2022 (DE) ..................... 10 2022 214 054.0

(51) Int. Cl.
*G06F 1/12* (2006.01)
(52) U.S. Cl.
CPC ..................... *G06F 1/12* (2013.01)
(58) Field of Classification Search
CPC ..... G06F 1/12; G06F 1/06; G06F 1/08; G06F 1/10; G06F 9/4881; G06F 9/461; G06F 9/52
See application file for complete search history.

(56) References Cited

U.S. PATENT DOCUMENTS

| | | | |
|---|---|---|---|
| 12,159,057 B2 * | 12/2024 | Hsu | G06F 8/453 |
| 12,175,285 B1 * | 12/2024 | Zisman | G06F 13/28 |
| 2004/0066765 A1 * | 4/2004 | Segal | H04J 3/1682 370/335 |
| 2006/0179436 A1 * | 8/2006 | Yasue | G06F 8/45 718/100 |

(Continued)

OTHER PUBLICATIONS

Anderson and Holman: "Efficient Pure-buffer Algorithms for Real-time Systems," Proceedings of Seventh International Conference on Real-Time Computing Systems and Applications, Cheju, Korea (South), IEEE (2000), pp. 57-64, doi: 10.1109/RTCS.2000.896371.

(Continued)

*Primary Examiner* — Raymond N Phan
(74) *Attorney, Agent, or Firm* — NORTON ROSE FULBRIGHT US LLP

(57) ABSTRACT

A method for operating a data processing system for processing data, which repeatedly executes a plurality of data processing tasks. The method includes the following steps for the operation of the data processing system: executing a synchronization function in each clock pulse before the start of the relevant data processing task to achieve synchronization of the buffer memories for a plurality of data processing units; executing the individual data processing tasks at their relevant repetition rate in the time grid on one of the data processing units of the data processing system; outputting output data by the individual data processing tasks into respectively provided memory areas of the buffer memory assigned to the clock pulse of the grid; and reading in input (Continued)

data by the individual data processing tasks from respectively provided memory areas of the buffer memory which are assigned to the preceding clock pulses of the grid.

12 Claims, 7 Drawing Sheets

(56) References Cited

U.S. PATENT DOCUMENTS

2020/0117505 A1* 4/2020 Chen ..................... G06F 9/542

OTHER PUBLICATIONS

Shi, et al.: "Multiprocessor Synchronization of Periodic Real-Time Tasks Using Dependency Graphs," 2019 IEEE Real-Time and Embedded Technology and Applications Symposium (RTAS), Montreal, QC, Canada, (2019), pp. 279-292, doi:10.1109/RTA.2019.00031.

* cited by examiner

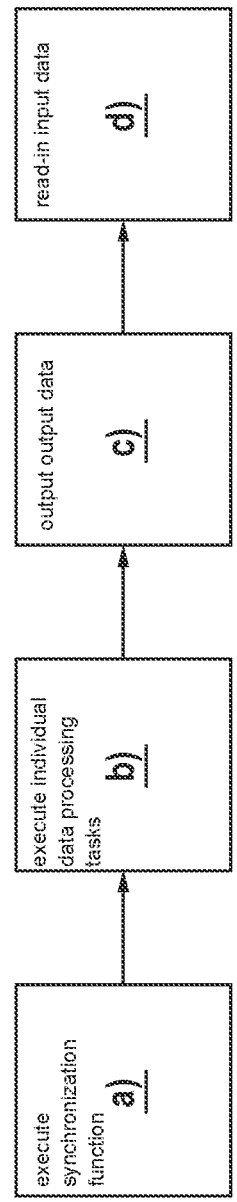

METHOD FOR OPERATING A DATA PROCESSING SYSTEM

FIELD

The present invention relates to a method for operating a data processing system. The method and the data processing system according to the present invention can be used, for example, for processing data for partially automated and highly automated driving, for example in order to process environmental data from the surroundings of a motor vehicle for functions of driver assistance systems. Another area of application for the method according to the present invention disclosed herein for operating a data processing system is complex robotic systems.

BACKGROUND INFORMATION

The complexity of data processing in this context is extraordinarily high. Very large volumes of data have to be processed at high speed. Large amounts of memory are required for the data to be processed. At the same time, the safety requirements are greatly increased, especially with regard to the so-called functional safety requirements. No errors must be allowed to occur during the data processing. Taking the functional safety requirements into account also increases system complexity.

Software that is operated on data processing systems for such applications often has a structure in which a complex cascade or a complex of consecutive data processing modules processes input data to form output data, wherein individual data processing modules each process input data to form output data, wherein the output data can then be input data for other data processing modules. The individual data processing modules often function as filters that perform certain data processing functions. This data processing is often an image processing. Input data are often data from sensors (e.g., environmental data, in particular camera images). The individual data processing modules regularly form a complex network. The exchange of output data and input data between the various data processing modules regularly requires efficient mechanisms for the data transfer. At the same time, parallel data processing in different data processing modules is often necessary. This means, for example, that a first data processing module for receiving and processing camera images from an environment camera preferably works in parallel with a further data processing module which further processes the camera images processed by the first data processing module in order to develop decision data for a highly automated driving function on this basis.

In motor vehicles and robotic systems, central control units are usually provided which form the execution platform for software that is used, for example, for autonomous or partially or highly automated driving.

One or more so-called SOC (System on Chip) modules are normally installed in central control units. Each of these SOCs consists internally of a plurality of computing units. The computing units used include, for example, performance cores, safety cores, DSPs (digital signal processors), hardware accelerators, DNNs (deep neural networks), and hardware video image conditioning.

Software that is operated on such hardware and that is intended to effectively utilize the performance of such hardware must be strongly adapted to the hardware. In particular, the desire to utilize many computing units on a single chip as effectively as possible poses extreme challenges in software development and in the analysis of problems in the software/during debugging.

Copying data when transferring between different data processing modules is often to be avoided, for performance reasons. Data processing modules are often intended to read input data from the memory of a SOC module where upstream data processing modules or their data processing steps have stored this data from output data. In this way, copying processes that have to be managed by an operating system can be avoided and the overall data processing performance can be greatly increased.

Approaches in the software structure that make the complexity manageable are extremely important in order to be able to develop and maintain such software efficiently. The keyword "deterministic" operation is extremely important in this context. In particular, in the case of data processing modules that build on one another and operate in parallel with one another, it is important to be able to understand which data processing module is processing which input data at which time. It often also has to be ensured that different data processing modules process the same input data.

Given unordered access to the available input data, in some circumstances this may not be achievable, or may be achievable only with very high effort. Through deterministic communication, here the data on which the particular data processing is based are unambiguously determined. Such determinism can for example be achieved at least in part by means of a temporally predetermined communication, which is characterized in particular by the fact that the times at which input data and output data are exchanged between individual modules are unambiguously determined.

A frequently used principle for the communication of data processing modules is the "single publisher multiple subscriber" scheme (one party can write and publish data, a plurality of parties can have read access to this data). This is one approach to achieving copy-free data transfer. Such copy-free methods for data exchange again increase the complexity because they may require dynamic memory management, which monitors where output data are stored in each case, ensures that there is no unwanted overwriting of output data which are processed by other modules as input data, and so on. In addition, the methods used nowadays often lead to a temporal decoupling of the communication. This requires additional effort in software development and maintenance in order to be able to track which data are processed when and how.

SUMMARY

An object of the present invention is to provide an advantageous method for operating a data processing system.

The present invention relates to a method for operating a data processing system for processing data, wherein the system is set up for the repeated execution of a plurality of different data processing tasks. According to an example embodiment of the present invention:

a time grid with a clock pulse is provided for the execution of the individual data processing tasks, a predetermined repetition rate is specified for each data processing task, wherein the repetition rates each define a repetition clock pulse which corresponds in each case to an integer number of clock pulses of the grid;

the repetition clock pulse of the data processing task with the highest repetition rate corresponds to the clock pulses of the time grid;

data processing tasks build on one another, so that at least one data processing task processes output data of a further data processing task as input data;

a number of buffer memories are provided, which are assigned to the clock pulses of the time grid and are available in turn, so that output data generated during the relevant clock pulse are written to the relevant buffer memory and output data generated during previous clock pulses for a number of clock pulses are still available in other buffer memories, the data processing system is operated on a data processing device comprising at least two data processing units with processors and memory modules, wherein the data processing tasks are assigned to at least one data processing unit, and memory areas of the buffer memories are made available on the memory modules of the corresponding data processing units, wherein according to an example embodiment of the present invention, the following steps are carried out for the operation of the data processing system:

a) executing a synchronization function in each clock pulse before the start of the relevant data processing task in order to achieve synchronization of the buffer memories for a plurality of data processing units;

b) executing the individual data processing tasks at their relevant repetition rate in the time grid on one of the data processing units of the data processing system, Substitute Specification c) outputting of output data by the individual data processing tasks into respectively provided memory areas of the buffer memory assigned to the clock pulse of the grid, d) reading in of input data by the individual data processing tasks from respectively provided memory areas of the buffer memory which are assigned to the preceding clock pulses of the grid.

It is preferable for output data of data processing tasks to be further processed as input data for other data processing tasks in principle without a copying operation.

According to an example embodiment of the present invention, output data from data processing tasks are preferably physically stored in the buffer memory. At the exact location where the output data are stored, further data processing tasks read in these output data as input data. This concept can also be referred to as "copy free" communication. The communication described herein of input data and output data using the method described herein therefore preferably takes place in "copy free" fashion. This concept is applied in particular to the input data and output data described herein. Other messages can be exchanged between the data processing modules using other methods (in addition to the method described herein).

It may be particularly advantageous if the synchronization function in step a) enables external memory accesses by data processing units to memory modules of other data processing units, in which it is ensured that all output data of previously executed data processing tasks are available.

Moreover, according to an example embodiment of the present invention, it is advantageous if at least one cache memory in at least one data processing unit is emptied by the synchronization function in step a) and data contained therein are stored on a memory module of the data processing unit in such a way that external memory accesses by other data processing units to this data are enabled.

According to an example embodiment of the present invention, the data processing system is in particular a SOC system (SOC=System on Chip), which is set up with software to perform complex data processing tasks that enable, for example, functions of autonomous, highly automated or partially automated driving.

According to an example embodiment of the present invention, the data processing task is preferably carried out by a data processing module which is set up for carrying out the corresponding data processing task. The data processing module is preferably software that is set up to process input data (e.g., of a camera image or another data set) and generates output data based on this. The input data preferably have a specific format, which must be adhered to so that the data processing module can process said data. The data processing module is, for example, a filter or a program function. The data processing task refers to the one-time execution of the data processing module with specific input data. Each individual execution of the data processing module in the grid is referred to as a data processing task. A plurality of executions of the data processing module in temporal succession is also referred to as "data processing tasks." Different types of data processing tasks that build on each other are also referred to here as a "plurality" of data processing tasks. Each data processing task can also be referred to as a "task."

The method described herein reduces the complexity during communication and thus enables efficient deterministic communication, even from a copy-free point of view. This is achieved by using a deterministic communication concept. The grid of tasks defines a cyclical task system.

According to an example embodiment of the present invention, Buffer memories are preferably reserved for a number of clock pulses. For example, there are buffer memories for a total of 8 clock pulses. Buffer memories are defined here at the level of the clock pulses. Different data processing tasks can have their own memory areas within a clock pulse for storing their output data. Preferably, a memory area for storing output data of a specific data processing task is located within a buffer memory for a specific clock pulse whenever the repetition clock pulse of the data processing task specifies this. An example: if the repetition clock pulse of the data processing task corresponds to four times the clock pulse of the grid, then preferably in every fourth buffer memory for a clock pulse there is a memory area for the relevant data processing task for storing its output data. The data processing tasks then place their output data into the buffer memories in turn, so that (in this case) each buffer memory is written with output data every eight clock pulses. For example, one of the buffer memories is always written to by one of the data processing tasks, so that the output data from seven previous executions of the data processing task is then always still available. This takes place in steps b) and c). During each clock pulse, there is a unique assignment to a buffer memory that is "active" for this clock pulse. And, if applicable, there is a unique assignment to an associated data processing task (or tasks) whose repetition clock pulses end at this clock pulse. Output data from the data processing task can be written to this buffer memory. In this case, a write access to the other seven buffer memories is then not possible. The data can be read from each of these buffer memories as input data by other data processing tasks in accordance with step d). In the present example case of eight buffer memories, the output data from seven previous executions of data processing tasks are available. After 8 clock pulses have passed, the data processing tasks always start again to overwrite the content of previous executions of the data processing tasks. This is possible because all the data processing tasks run in a common time grid. In the example, after the 8th clock pulse it is ensured that the data from the previous 7 clock pulses have been received by the other data processing tasks. The buffer memories of the individual clock pulses are filled with output data in cyclical/rotating/rolling fashion by the data processing tasks.

In the method described here, buffer memories are to be understood as an overarching conceptual/virtual structure formed by memory areas in memory modules of the individual data processing units of the data processing device. From the perspective of the individual data processing modules which contain the program code to be executed of the individual data processing tasks, it is irrelevant which memory areas belong to the buffer memories. When implementing the program code of the data processing modules, it is preferably of no or at least of secondary relevance where (in which memory area or on which memory module) the data processing task stores output data. The buffer memories are therefore preferably a concept from the perspective of the respective data processing tasks. Preferably, data processing tasks executed by a particular data processing unit also store output data that they themselves produce in a memory area which is provided on a memory module of that data processing unit and which can be accessed by relevant sending and receiving data processing tasks.

The buffer memory concept offers decisive advantages in terms of reducing the complexity and the expenditure of management and computing time required for communication. In addition, a very advantageous implementation of deterministic communication also results from a copy-free point of view. The approach that buffer memories can extend in a certain way over memory areas on different memory modules of different data processing units of a data processing device makes it possible to apply the concept of buffer memories even if the data processing is carried out, using the data processing system described herein, in distributed fashion over different data processing units of a data processing device, where the memory modules of the data processing units are not coherent or consistent in their basic structure.

The statement that the memory modules of the data processing unit are not coherent or consistent in their basic structure means that in certain situations memory accesses can read out different data from the memory, depending on whether the memory access is an internal memory access from the data processing unit itself or an external memory access from another data processing unit of the data processing device.

In principle, the method according to the present invention described here is suitable for operation on data processing devices in which the data processing units participating in the method are able to carry out read access and, if appropriate, also write access to memory modules of other data processing units participating in the method. However, such accesses (at least write accesses) are regularly slower than accesses to the data processing units' own memory modules. This is due in particular to the fact that special mechanisms/devices preferably exist within the data processing units to accelerate access to their own memory modules, in particular memory caches. Write caches are particularly preferred. If data (e.g., the output data described here) are written to the memory area, it can happen that these data do not actually/physically land directly on the memory module, but at first only in a memory cache (e.g., in the write cache), from which these data are then stored on the memory module itself as soon as the data lines (pipelines) provided for this purpose are free. This is also a reason why external memory accesses or internal memory accesses can show different data. However, this is remedied by the described synchronization function carried out in step a). The synchronization function carried out in step a) ensures that internal memory accesses and external memory accesses always return the same data (in relation to the clock pulse) and therefore the output data stored in the memory areas in the previous clock pulses are always output correctly, regardless of the type of access. The synchronization function establishes a so-called memory coherence.

This may be achieved, for example, in that cache memories within the data processing units are preferably completely emptied by the synchronization function. In particular, this means that the relevant content of the particular cache memory is transferred fully to the designated memory areas on the memory modules (via the data lines/pipelines provided for this purpose).

It is particularly preferred if the synchronization function is in each case executed in advance of the data processing task with the highest repetition rate.

It is also preferred if the synchronization function is executed for each of the data processing units.

For example, memory caches of the data processing units taking part in the described method are emptied by the synchronization function.

In addition, it is preferred if the synchronization function has an execution priority corresponding to the execution priority of the data processing task with the highest priority.

According to an example embodiment of the present invention, the synchronization function is preferably executed as a so-called pre-task to the data processing task with the highest repetition rate, i.e., temporally before the data processing task with the highest repetition rate.

In variant embodiments of the present invention, the synchronization function can also be integrated into the data processing task with the highest repetition rate or with the highest priority or be integrally connected to this data processing task, for example as the first program function implemented within the data processing module for the data processing task.

This ensures the memory consistency of the individual data processing units once per clock pulse. It has been found that establishing memory consistency once per clock pulse requires considerably less effort than establishing memory consistency individually at the message level. Overall, the synchronization processes required to establish memory consistency are greatly reduced by using the described fixed grid of clock pulses. This applies even though the synchronization is carried out at the highest intended repetition rate (at the level of the clock pulses of the grid). This applies in particular because, in order to execute the synchronization function, it is not necessary to take into account which output data are actually synchronized by which data processing module. The synchronization function can work independently of the exchange actually taking place of data between the data processing tasks.

If necessary, the synchronization function can, however, use existing knowledge about the relationships and the execution location of the individual data processing tasks to further reduce the synchronization effort, wherein the location of the execution here in particular indicates on which data processing unit the corresponding data processing task is or was executed, and wherein the relationships here are in particular information about which further data processing tasks to be executed further process the generated output data.

In such variant embodiments of the present invention in which relationships and the execution location are taken into account, cache memories (in particular write buffers, caches and pipelines of the individual data processing units) are preferably emptied, i.e., flushed or invalidated, as required. This includes in particular a so-called "invalidate-refresh," which forces data to be read again from a memory. This (the flushing) takes place at the sender side, i.e., in the data processing units in which the data processing tasks processing output data were performed. Invalidation takes place at the receiver side, so that the data to be received corresponds to the data previously output by other processing units. Finally, in the synchronization function suitable measures are to be provided that fill the respective memory modules with the output data in such a way that internal memory accesses and external memory accesses yield the same data. Preferably, special memory coherence mechanisms of the individual data processing units are also used as required for this. These include, for example, fences and memory barriers and specific peripheral accesses to achieve memory coherence.

As a result, consistent data are available to the individual data processing units that use the method. The potential lack of memory coherence of the hardware computing units is compensated for thanks to the deterministic communication and the synchronized cyclic operation of the method with regard to the communication described in the method.

The method is preferably designed to be copy-free. "Copy-free" means, for example, that the output data of a data processing task are not copied, so that they can be used as input data by other data processing tasks. The data processing tasks retrieve their input data from the location in the memory where they were previously stored. The respective areas where data are stored and read in are permanently stored. It is also particularly advantageous that a static buffer management is static. Memory areas which form the individual buffer memories are permanently stored for the entire data processing system and are preferably not changed during the runtime of the data processing system. This means that their addresses via which data processing modules can access the buffer memories or their memory areas are not changed. The content of the buffer memories or the content of their memory areas naturally changes regularly during the runtime of the method due to the work of the data processing tasks.

It has been described that a repetition clock pulse or repetition rate is preferably defined for the individual data processing tasks. The data processing task with the highest repetition rate has the shortest repetition clock pulse, which preferably corresponds to the time grid of clock pulses.

Preferably, the repetition clock pulses of the individual data processing tasks are in each case integer multiples of each other. The individual data processing tasks can also be referred to as cyclical tasks, which are in an integer cycle relationship to each other.

If necessary, however, the data processing system can be integrated into a higher-level, larger data processing system in which only some of the tasks operate according to the method described here. In such a data processing system, which is higher-level relative to the data processing system described herein, there may therefore be further tasks with which communication preferably does not take place in the manner described here, or takes place with other methods.

According to an example embodiment of the present invention, a system of cycles of repetition clock pulses and repetition rates of the data processing tasks working together according to the method described herein can for example be:

clock pulse length of the grid: 1 ms [millisecond];

repetition rate of the data processing task with the highest repetition rate: 1000 [1/s repetitions per second]=repetition rate 1 ms [millisecond];

repetition rate of a further data processing task 200 [1/s repetitions per second]=repetition clock pulse 5 ms [milliseconds];

repetition rate of a further data processing task 100 [1/s repetitions per second]=repetition clock pulse 10 ms [milliseconds]; and repetition rate of a further data processing task 10 [1/s repetitions per second]=repetition clock pulse 100 ms [milliseconds].

The transfer of output data from one data processing task as input data to another data processing task is also referred to here as "communication" of the data processing tasks. The communication takes place in deterministic fashion. Communication takes place in "single publisher multiple subscriber" fashion (one is permitted to write and publish data; a plurality are permitted read access to these data).

It is also advantageous if data processing tasks intended for execution are activated at the start times of each clock pulse, wherein the start of data processing tasks with a higher repetition rate takes place temporally before the start of data processing tasks with a lower repetition rate.

It is also advantageous if the execution of data processing tasks with a higher repetition rate is prioritized over the execution of data processing tasks with a lower repetition rate.

Preferably, according to an example embodiment of the present invention, an operating system with which the software of the data processing system described herein is operated on hardware and the configuration of this operating system ensures that the higher-frequency data processing tasks have a higher priority and are therefore always preferentially executed. Preferably, activation of the data processing tasks/task activation is done in such a way that the high-frequency data processing tasks are activated earlier than or at least simultaneously with the low-frequency data processing tasks.

In the vast majority of cases, the data processing tasks with the higher repetition rate are started further up, i.e., earlier, in a cascade of data processing tasks, building on one another, of the data processing system described herein. Here is a highly simplified example: the data processing task with the highest repetition rate structures, e.g., camera images as input data and outputs them as output data, which are then used by subsequent data processing tasks to perform traffic sign recognition, for example.

The order of processing, in which the data processing tasks with the highest repetition rate come first, can ensure, for example, that the output data of the data processing tasks with the highest repetition rate are always available when the data processing tasks with the lower repetition rate start. Due to the fact that the data processing tasks with the low repetition rate build on the data processing tasks with the higher repetition rate, the described prioritization causes the data processing system as a whole to behave as if all data processing tasks were started at exactly the same time, which is regularly not possible due to the structure of the hardware and the operating system.

According to an example embodiment of the present invention, it is also advantageous if the buffer memories are structured in such a way that memory areas are provided within the buffer memories for specific output data from data processing tasks.

Preferably, the memory areas of the buffer memories for specific output data are each provided in the data processing units on which the data processing tasks that generate the respective output data are also executed.

It may also be advantageous if, for data processing tasks that obtain input data from buffer memories, it is specified from which memory areas of the buffer memory the input data are to be read.

According to an example embodiment of the present invention, memory areas are therefore fixedly defined for individual data processing tasks in the buffer memories. During the runtime of the data processing system, the buffer memories and the memory areas in the buffer memories are preferably not changed.

According to an example embodiment of the present invention, buffer memories preferably exist at the clock pulse level. That is, a buffer memory is provided for each clock pulse.

Particularly preferably, these buffer memories are each subdivided into fixedly defined memory areas, each of which forms memory space for storing output data of specific data processing modules or data processing tasks. Thus, each buffer memory preferably contains a plurality of messages from different data processing tasks.

If necessary, the buffer memories for different clock pulses can also be partitioned differently with different memory areas. This can be helpful because, for example, in certain clock pulses it is known that a plurality of data processing tasks are restarted here, so that output data from different data processing tasks are produced. It is also possible that the number of past clock pulses from which output data are held available (not overwritten) is different for different data processing tasks. It is also advantageous to divide the buffer memories into further sub-buffers so that a separation of data can take place. This can be used particularly advantageously to meet safety requirements; i.e., the achievement of "freedom of interference." In particular, it is possible to protect the individual buffer memories from each other with regard to access, to block them for individual data processing tasks, etc. Such functions can be provided by an operating system.

It may be particularly advantageous if messages between the data processing tasks are only exchanged via the buffer memories, so that communication between the data processing tasks only takes place via the buffer memories.

The term "messages" here refers to input data and output data that are exchanged between the data processing modules in the data processing system that work together according to the method. The term "messages" refers in particular to communication which is not controlled by a higher-level operating system or a higher-level controller, but which takes place in uncontrolled fashion on the buffer memories between the individual data processing tasks according to the method described here. A higher-level operating system or a higher-level controller only provides the buffer memory. The exchange of input data and output data is self-organizing according to the method described here. The term "messages" does not refer to other communication that may be required to monitor and control the data processing tasks and that may take place via other channels or the operating system.

It is also advantageous if the selection and addressing of the buffer memories is calculated using associated task counters of the data processing tasks involved.

Preferably, access to the buffer memory assigned to the relevant clock pulse takes place via a mechanism that strictly counts the clock pulses. This mechanism can also be referred to as a clock pulse counter or task counter. The individual buffers can preferably also be addressed quasi-statically using simple arithmetic on the basis of the relationship between the clock pulses of the relevant data-sending data processing task and the clock pulses of the relevant data-receiving data processing task or of the clock pulse counter/task counter. Dynamic management of the buffers is therefore not necessary. This significantly reduces the effort involved in developing and analyzing the software of the data processing system.

Preferably, according to an example embodiment of the present invention, the addressing of the individual buffer memories is structured in such a way that a memory address of the buffer memory valid in each case can be generated directly from the task counter or the clock pulse counter or the clock pulses of the data-sending and data-receiving data processing tasks involved. Particularly preferably, the current value of the task counter flows into the respective memory accesses during the writing of output data or reading of input data by data processing modules, in such a way that no individual consideration of the system of buffer memories is made at all for the programming of the individual data processing module. Due to the structure of the buffer memories in conjunction with the task counter and suitable addressing, the individual data processing tasks preferably automatically store output data in the correct buffer memories and also automatically receive input data from the correct buffer memories.

According to an example embodiment of the present invention, it is also advantageous if the number of buffer memories is selected so that all input data are available that are required for the execution of each data processing task and that have been generated during previous clock pulses as output data of other data processing tasks.

A relatively large amount of memory in the form of the described buffer memory may have to be reserved in order to use the described method, especially if access to output data further in the past is also required for the data processing according to the described method.

In addition, it may be advantageous if the data processing system has a communication memory, wherein information is stored in the communication memory as to which output data are stored in which memory areas of the buffer memories.

Such a communication memory preferably has no mechanisms that allow deviations between the external memory access and the internal memory access, and thus preferably represents a secure communication path between the individual data processing units of the data processing device. However, such a communication memory usually has other disadvantages. For example, it allows lower data transfer rates, is slower, etc.

Such a communication memory can offer alternative possibilities for implementing the described synchronization function. For example, the synchronization function can store information in the communication memory that indicates to the data processing tasks processing the output data where or how the output data can be accessed.

It may also be advantageous if for step b) a controller of the data processing system, which controller is higher-level relative to the data processing tasks, determines on which data processing unit a data processing task is executed.

If necessary, this can be done in advance (as already described above) before the data processing is carried out with the data processing system or, if necessary, also during runtime, for example to distribute data processing tasks to different data processing units in a load-dependent manner.

In addition, it may be advantageous if for step c) and d) a controller that is higher-level relative to the data processing tasks determines on which memory area of a buffer memory particular data processing tasks will store their output data so as to be capable of being read in as input data by other data processing tasks.

Preferably, data are always stored in the memory modules of the data processing tasks in which the data processing tasks are also executed, because in particular mechanisms for accelerating the processing (e.g., cache memory) can then be used effectively. However, deviations may also occur here, depending on requirements, which do not run counter to the basic idea of the method described herein.

Also described herein is a data processing device. According to an example embodiment of the present invention, the data processing device comprises at least two data processing units which each have one or more processors and one or more memory modules, wherein the data processing device is configured such that it can be operated as a data processing system according to the described method.

According to an example embodiment of the present invention, the data processing device preferably has an operating system or a higher-level controller which takes over the execution of the individual data processing tasks and the provision of the buffer memories on the memory module(s).

According to an example embodiment of the present invention, the program code of the data processing modules is preferably located on the memory module(s) and is executed on the processors of the data processing device as a data processing task. Through the data processing tasks, the communication of input data and output data takes place on the buffer memory in accordance with the described method.

Further described herein is a computer program product comprising commands which, when the computer program product is executed by a computer, cause the computer to carry out the described method according to the present invention.

Further described herein is a computer-readable storage medium comprising commands which, when executed by a computer, cause the computer to carry out the described method according to the present invention.

The method and the technical environment of the method of the present invention are explained in more detail below with reference to the figures. The figures show preferred exemplary embodiments, to which the method is not limited. It should be noted, in particular, that the figures and in particular the size proportions shown in the figures are only schematic.

BRIEF DESCRIPTION OF THE DRAWINGS

FIG. 7 shows a flowchart of the described method according to an example embodiment of the present invention.

DETAILED DESCRIPTION OF EXAMPLE EMBODIMENTS

Figure 1:
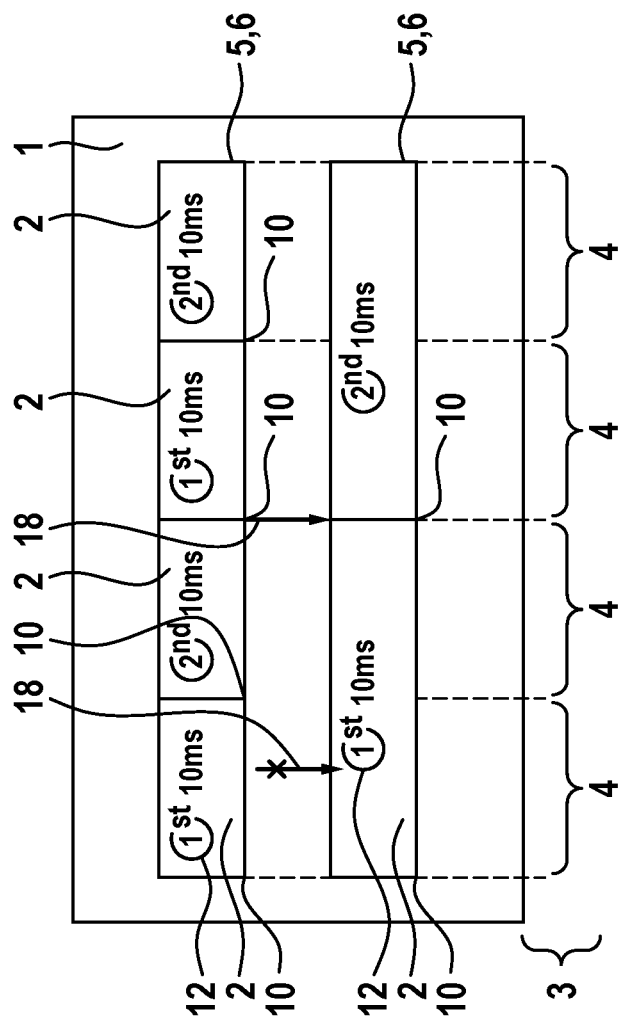
FIG. 1 generally shows a deterministic communication scheme, according to an example embodiment of the present invention.

The representation of data processing systems 1 in FIG. 1 to 4 is structured in the form of a timeline on which a grid 3 of clock pulses 4 is shown. Different data processing tasks 2 are shown in rows. A plurality of executions of data processing tasks 2 with different input data are shown one after the other in each row. The data processing tasks 2 are executed repeatedly in the grid 3 of clock pulses 4 with predefined repetition rates 5 and repetition clock pulses 6. This representation of a data processing system 1 serves the purpose of visualizing the communication between data processing tasks 2. Each data processing task 2 is represented as a block which is integrated into the grid 3 of clock pulses 4. Each data processing task 2 has a start time 10. Preferably, for each type of data processing task 2 there is a task counter 12 which counts through the individual repetitions of the relevant data processing task 2.

FIG. 1 generally illustrates a deterministic task system for starting data processing tasks 2 in a data processing system 1 which is frequently used. The data processing tasks 2 are executed repeatedly in the grid 3 of clock pulses 4 with predefined repetition rates 5 and repetition clock pulses 6. Here, the communication of output data 8 and input data 7 between individual data processing tasks 2 takes place deterministically, but in the form of messages 18 which are exchanged individually between individual data processing tasks 2, the exchange of which may have to be controlled by an operating system. The effort required to develop the program code for data exchange is considerable here.

Deterministic communication is characterized by the fact that messages 18 are always exchanged at fixed times, for example (as shown here) at the end of a clock pulse 4. The exchange of messages 18 at arbitrary times is prohibited. A corresponding prohibited message 18 (i.e., not permissible in the context of deterministic communication) is shown crossed out in FIG. 1.

Preferably, principles such as "single publisher multiple subscriber" (one is permitted to write and publish data and a plurality are permitted read access to these data) are also used in the schemata according to FIG. 1 to enable copy-free solutions for exchanging the messages 18 between the data processing tasks 2. In these so-called copy-free methods, complexity increases further, since, for example, dynamic buffer management becomes necessary.

Figure 2:
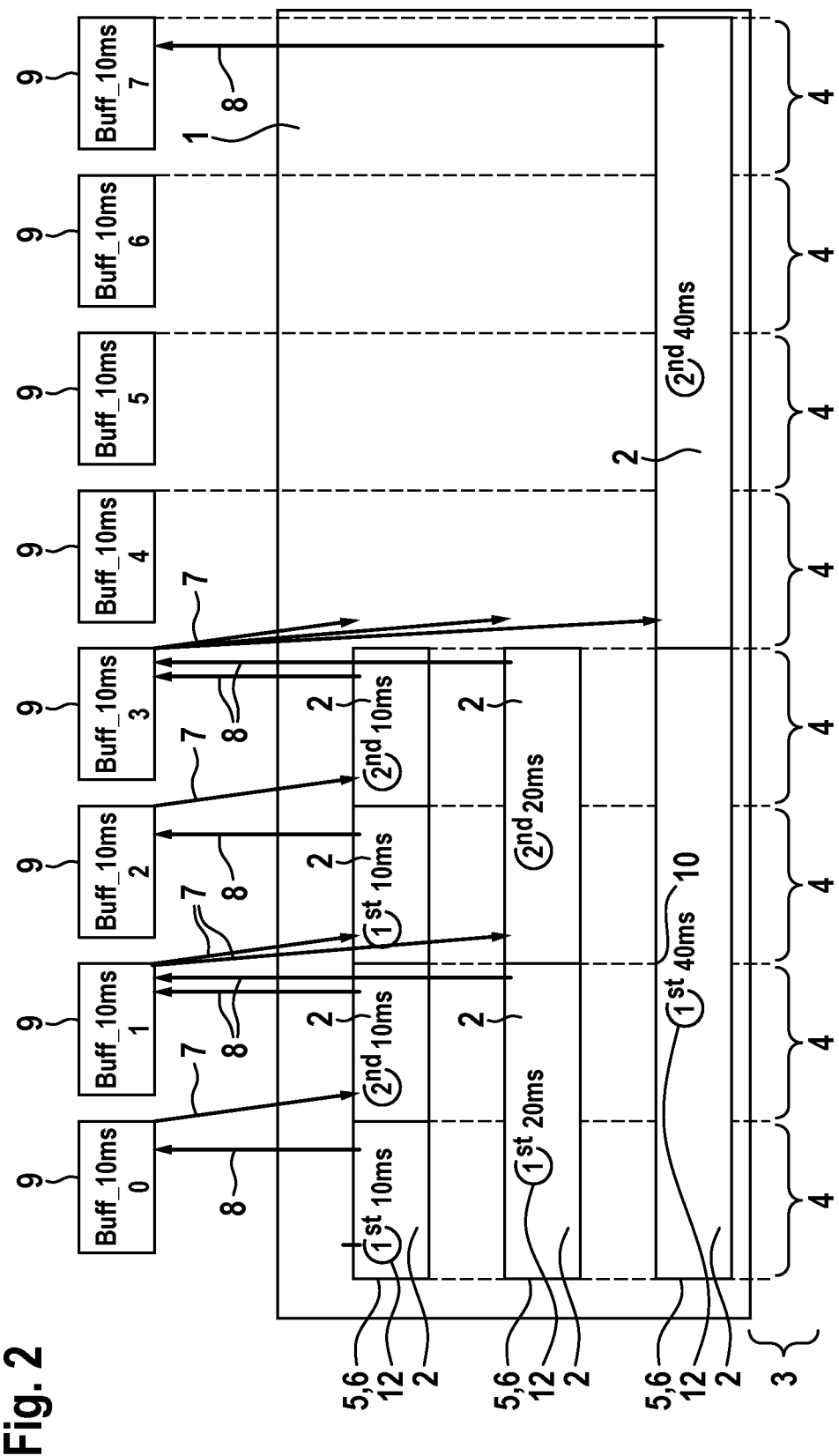
FIG. 2 shows a first variant embodiment of deterministic communication via buffer memories, according to the present invention.
Figure 3:
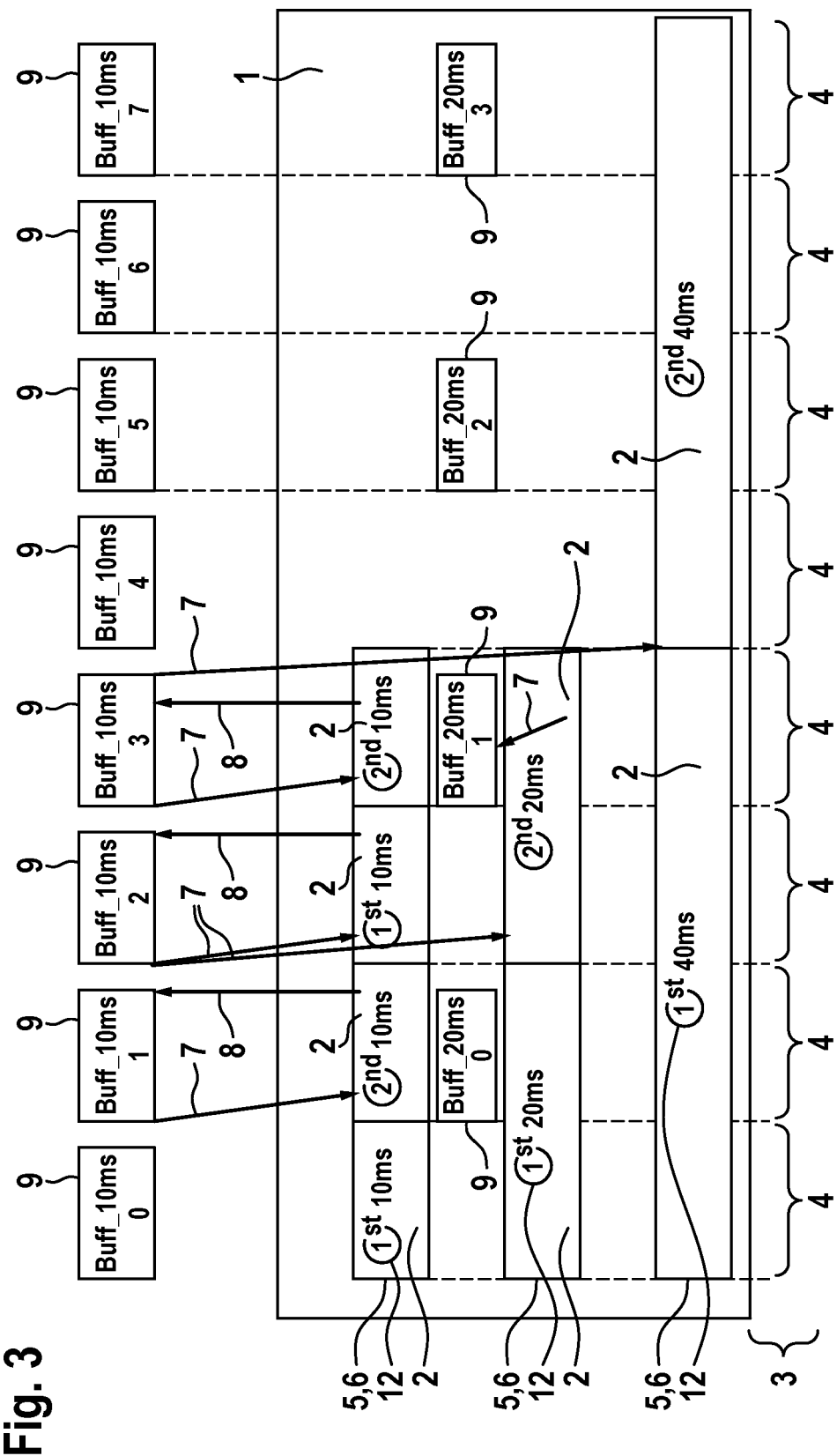
FIG. 3 shows a second variant embodiment of deterministic communication via buffer memories, according to the present invention.
Figure 4:
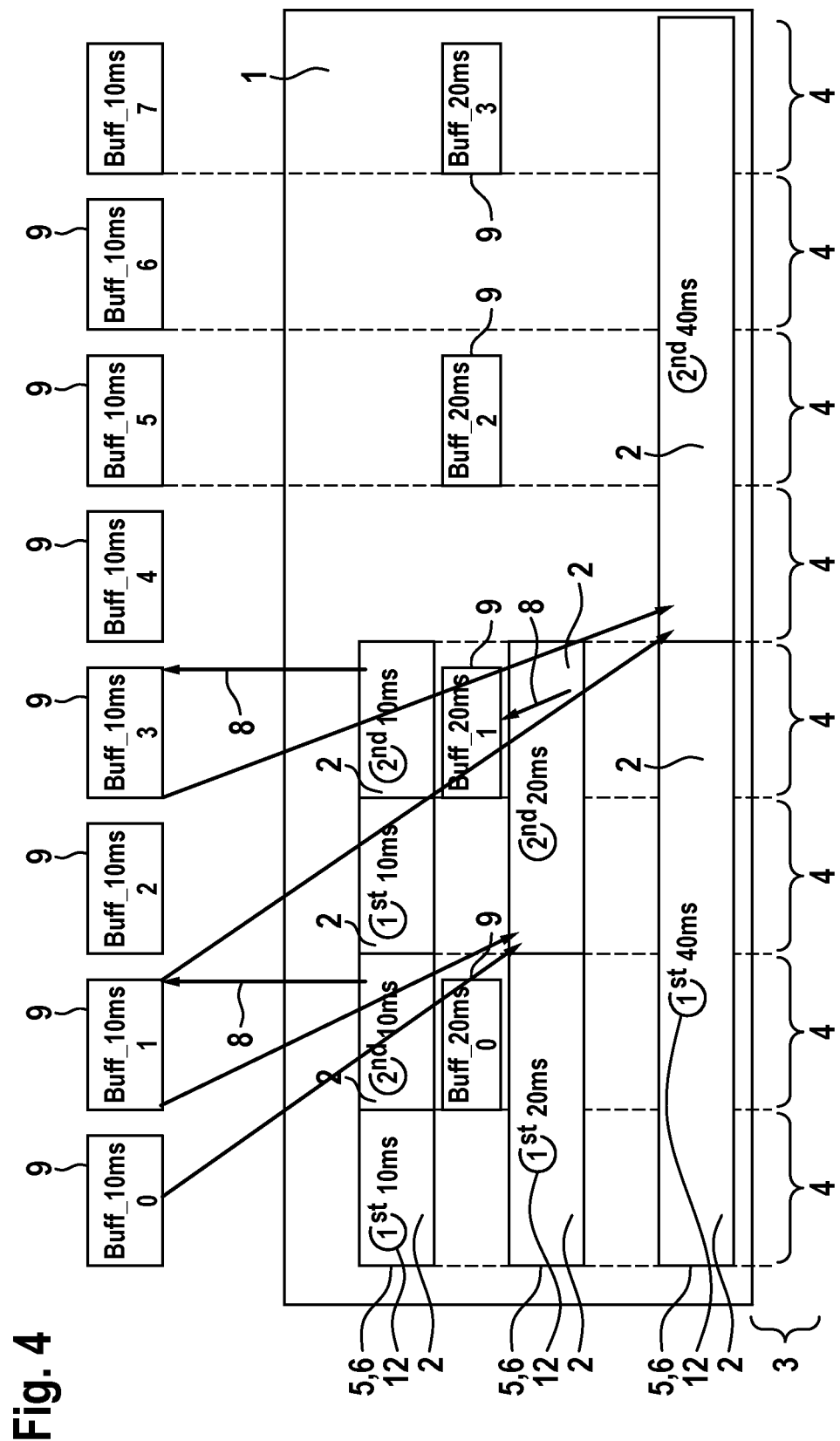
FIG. 4 shows a third variant embodiment of deterministic communication via buffer memories, according to the present invention.
Figure 5:
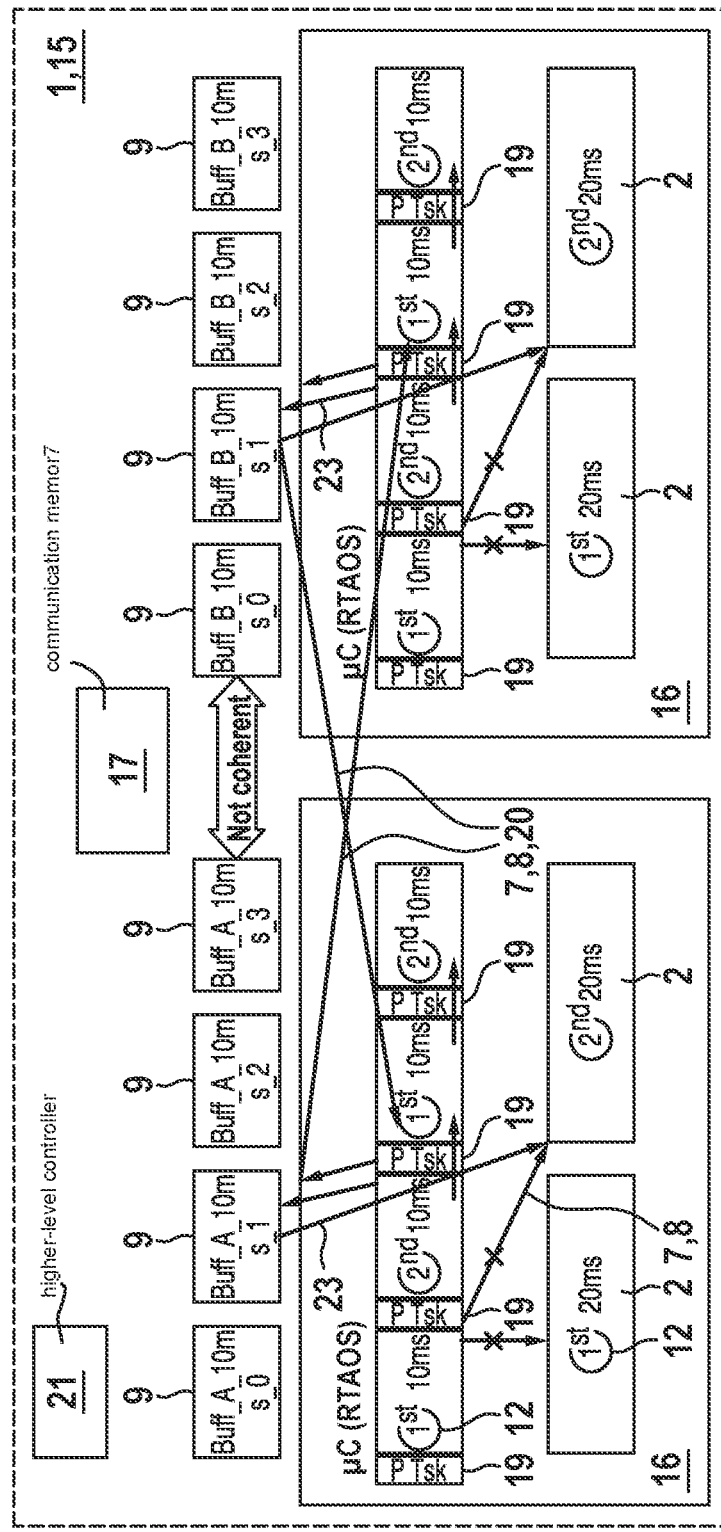
FIG. 5 shows a variant embodiment of deterministic communication via buffer memories according to FIG. 2 to 4, executed on a data processing device having a plurality of data processing units, according to the present invention.

FIG. 2 shows a first variant embodiment of deterministic communication via buffer memories 9 according to the method described herein. Buffer memories 9 are assigned to each of the clock pulses 4 of the grid 3. FIG. 2, as well as the following FIGS. 3, 4 and 5, are each based on FIG. 1 and supplement FIG. 1 with the features essential for the method described herein and for the data processing system 1 described herein. For the sake of clarity, some of the features in FIGS. 2, 3, 4 and 5 are not again provided with reference signs. The explanations for FIG. 1 also apply to FIGS. 2, 3, 4 and 5. There is no exchange of individual messages 18 as in FIG. 1, but instead output data 8 are written to currently active buffer memories 9 and input data 7 is read in from buffer memories 9 previously filled with output data 8. To reduce complexity and due to the fact that communication between the data processing tasks 2 takes place exclusively via the buffer memories 9, buffer management preferably takes place at task granularity and not at message granularity. Or in other words: an operating system which provides the environment for the described data processing system 1 and the described method provides the memory for the buffer memories 9 and not the memory for the individual messages. This significantly reduces the number of memory areas to be managed and the communication management effort, compared to management based on the individual communication messages.

Preferably, the buffers for communication are defined statically, i.e., at compile time, and are not changed during the runtime of the data processing system 1. During running operation, access is thus determined by the task activation or the task counter 12. Simple arithmetic is sufficient to determine the buffer memory 9. "True buffer management" is preferably not necessary. Preferably, only targeted access to the correct buffer memory 9 takes place, via addresses that are generated using the task counter 12. It is unambiguously defined for each task which buffer is to be used when.

FIG. 3 shows a second variant embodiment of deterministic communication via buffer memories 9 in a data processing system 1. FIG. 3 is based on FIG. 2, and therefore FIG. 2 can be used here to explain FIG. 3. Here, buffer memories 9 are not only defined for each individual clock pulse 4, but instead individual buffer memories 9 preferably exist in the clock pulse grid for particular communication partners. The term communication partners here means data processing tasks 2 which communicate with one another. This means that one data processing task 2 provides certain output data 8 on a recurring basis that are processed by another data processing task 2. The scheme of which data processing task 2 communicates with which other data processing task 2 is fixed and therefore deterministic. The deterministic communication scheme and the cyclic task scheme and the application of the "single publisher—multiple subscriber" principle enable static management of the buffer memories 9. Preferably, addressing of the buffer memories 9 takes place here based on the fixed communication partners (e.g., in each case via an ID of the communication partners (data processing tasks 2)) and via the task counter 12. Access to the buffers takes place in copy-free fashion as "single publisher multiple subscriber". The addressing of the individual buffers is then determined by the assignment of the communication participants to their tasks. If, for example, in the example shown in FIG. 3 definition takes place as follows:

2nd 20 ms task receives Buff_10 ms_1: the 2nd 20 ms task uses the task counter of the 10 ms task and the task counter of the 20 ms task and the clock pulse ratio of 10 ms to 20 ms to calculate the correct 10 ms buffer using simple arithmetic;

2nd 40 ms task receives the Buff 10 ms_3 and the Buff 20 ms_1: the 2nd 40 ms task uses the task counter of the 10 ms task and the task counter of the 40 ms task and the clock pulse ratio of 10 ms to 40 ms to calculate the correct 10 ms buffer using simple arithmetic. And the 2nd 40 ms task uses the task counter of the 20 ms task and the task counter of the 40 ms task and the clock pulse ratio of 20 ms to 40 ms to calculate the correct 20 ms buffer using simple arithmetic;

1st 10 ms task sends the Buff_10 ms_1: the 1st 10 ms task uses the task counter of the 10 ms task to calculate the correct 10 ms buffer using simple arithmetic;

etc.

Preferably, the communication from one execution of a data processing task 2 to the next execution of the same data processing task 2 can be carried out according to the same method. This refers to the case where a data processing task 2 processes output data 8 from a previous execution as input data 7. In this case, a data processing task 2 communicates with itself, so to speak, or takes internal, changing status variables into account when processing further input data 7. This case could also be solved using other approaches, e.g., a reserved internal buffer memory 9 for the relevant data processing task 2. However, it can likewise be advantageous to also act uniformly in this case using the described method. Preferably, less buffer memory 9 could then be required for this.

Advantageously, the number of buffers can be reduced, advantageously on the basis of the actually required communication of output data 8 and input data 7 between data processing tasks 2. FIG. 3 can be used to explain such a reduction, for example for the 40 ms data processing task 2. If this data processing task 2 did not have to receive any data from the 10 ms data processing task 2, then here the number of 10 ms buffer memories 9 could be halved from 8 to 4.

The described method and the described data processing system 1 also open up the possibility of being able to access a plurality of buffer memories 9 simultaneously without extra effort. Since the buffer memories 9 are statically defined and the clock pulses 4 or the repetition clock pulses 6 are in an integer cycle relationship to each other, a low-frequency data processing task 2 with a low repetition rate 5, for example, can access all the data of the higher-frequency data processing tasks 2 with a higher repetition rate 5. Preferably, this applies with the restriction that only output data 8 are available that were generated in the previous activation period of the associated low-frequency data processing task 2.

FIG. 4 shows another development; here FIG. 2 and FIG. 3 are also used to explain FIG. 4. In addition, the static allocation of the buffer memories 9 also enables deterministic access to data from multiple activations of higher-frequency data processing tasks 2. This simplifies the processing of data from higher-frequency data processing tasks 2 without the complexity otherwise required to identify and access these data. In the example in FIG. 4, this is done for example as follows:

2nd 20 ms task accesses the data of the 1st and 2nd 10 ms task;

2nd 40 ms task accesses the data from Buff 10 ms_2 and Buff 10 ms_3;

2nd 40 ms task accesses Buff_10 ms_0, Buff_10 ms_1, Buff 10 ms_2 and Buff 10 ms_3;

etc.

FIG. 5 shows how the method described is actually carried out with a data processing system 1, which is set up on a data processing device 15 with two data processing units 16.

In the illustration according to FIG. 5, the details shown in FIGS. 2 and 4 regarding the time grid 3 and the clock pulses 4 have been partially omitted for the sake of clarity and only two data processing tasks 2 per data processing unit 16 are shown as examples. In this respect, the illustration in FIG. 5 is further simplified in accordance with the illustrations in FIGS. 2 and 4.

For each data processing unit 16, here the data processing tasks 2 that are performed on the relevant data processing unit 16 are shown. Buffer memories 9 for each individual clock pulse 4 are provided here for each data processing unit 16, with the buffer memory areas associated with the same clock pulse 4 each forming a buffer memory 9. Buff_A_10 ms_0 thus forms a buffer memory 9 together with Buff_B_10 ms_0, Buff_A_10 ms_1 forms a buffer memory 9 together with Buff_B_10 ms_1, and so on. A buffer memory 9 therefore includes memory areas 11 in memory modules 14 in both data processing units 16. This concept is explained in more detail below with reference to FIG. 6.

The data processing units 16 can access one another. In particular, this means that a data processing unit 16 can access memory areas 11 or buffer memory areas of the buffer memory 9 of the other data processing unit 16, and vice versa. Such accesses from one data processing unit 16 to memory areas 11 of the other data processing unit 16 are referred to here as so-called external memory accesses 20, and they are regularly required when carrying out the described method on a data processing device 15 with a plurality of data processing units 16, namely in particular whenever a data processing task 2 has been executed on a data processing unit 16 in a clock pulse 4 and output data 8 have been stored there in a buffer memory 9 and then (in a subsequent clock pulse) a data processing task 2 is executed on another data processing unit 16 and these output data 8 are required as input data 7. Some external memory accesses 20 are shown schematically in the illustration in FIG. 5. In order to carry out the described method, it is regularly necessary for the data processing device 15 or the data processing units 16 of the data processing device 15 to be set up in each case for the external memory accesses 20 described or to enable such external memory accesses 20 in principle.

The storage of output data 8 of the execution of a data processing task 2 is often carried out on the data processing units 16 in each case with a quite complex mode of operation, which is explained in more detail below using FIG. 6 as an example and the details of which can also vary greatly depending on the type of data processing unit 16. To summarize: if a data processing task 2 stores data in the memory of the relevant data processing unit 16, the visibility of these data for external memory accesses 20 may differ from the visibility of these data for accesses of the data processing unit 16 itself (referred to here as internal memory accesses 23), for example because data are still in internal caches, etc.

In the method described here, for this reason the synchronization function 19, which synchronizes the output data 8, written to the buffer memories 9, of the individual data processing tasks 2, is executed before the start of the data processing task 2 with the highest repetition rate. The execution of the synchronization function 19 ensures in particular that internal memory accesses 23 and external memory accesses 20 each show the same data pool and thus the same stored output data 8 in the buffer memories 9.

Preferably, the data processing device 15 has a higher-level controller 21 which controls the distribution of the individual data processing tasks 2 to the data processing units 16. This distribution can if appropriate be statically defined before the operation of the described data processing system 1 (before the start of the described method). This distribution can also be adjusted during runtime (during operation of the described method) depending on the load.

Preferably, the described data processing device 15 furthermore also has a communication memory 17, via which messages 18 can be exchanged between the individual data processing units 16 of the data processing device 15 without the described differences between the external memory access 20 and the internal memory access 23 occurring. Such communication memories 17 can be additionally used by the synchronization function 19 to exchange information regarding stored output data 8 and thus, if necessary, to provide information that enables external memory access 20 to certain data.

In particular, the synchronization function 19 is also referred to as the so-called pre-task for the data processing task 2 with the highest repetition rate. If necessary, the synchronization function 19 or the pre-task can also be integrated into the task with the highest repetition rate. Particularly preferably, this is done directly as the first action within the data processing task 2.

Preferably, when all synchronization functions 19 have been processed on all involved data processing units 16, the actual execution of the data processing tasks 2 is started.

As a result, consistent data are available to the individual data processing units 16 that use the method. The potential lack of memory coherence of the data processing units 16 is compensated for thanks to the deterministic communication and the synchronized cyclic operation of the method with regard to the communication described in the method.

The deterministic data exchange and the coupling with the cyclic task system make it possible to couple different data processing units 16. FIG. 5 shows the data processing units 16 (core A and core B) which are coupled. Preferably, here the measures required to establish memory coherence can be carried out at a few fixedly defined points using the synchronization functions 19. For the successful application of the described method, it must be ensured that all synchronization functions 19 are terminated before the actual data processing tasks 2 start. In the drawing, the synchronization functions 19 on core A and B must be completed before the 10 ms task is activated on core A and B. Since the highest-frequency data processing task 2 with the highest repetition rate (in the drawing: task 10 ms) preferably has the highest priority and the pre-task preferably has the same priority, this ensures that the highest-frequency task (in the drawing: task 10 ms) and the lower-frequency tasks (in the drawing: task 20 ms) are activated after the synchronization function 19 at the earliest. This ensures that the data are transparently available on all data processing units 16 in the next activation.

Figure 6:
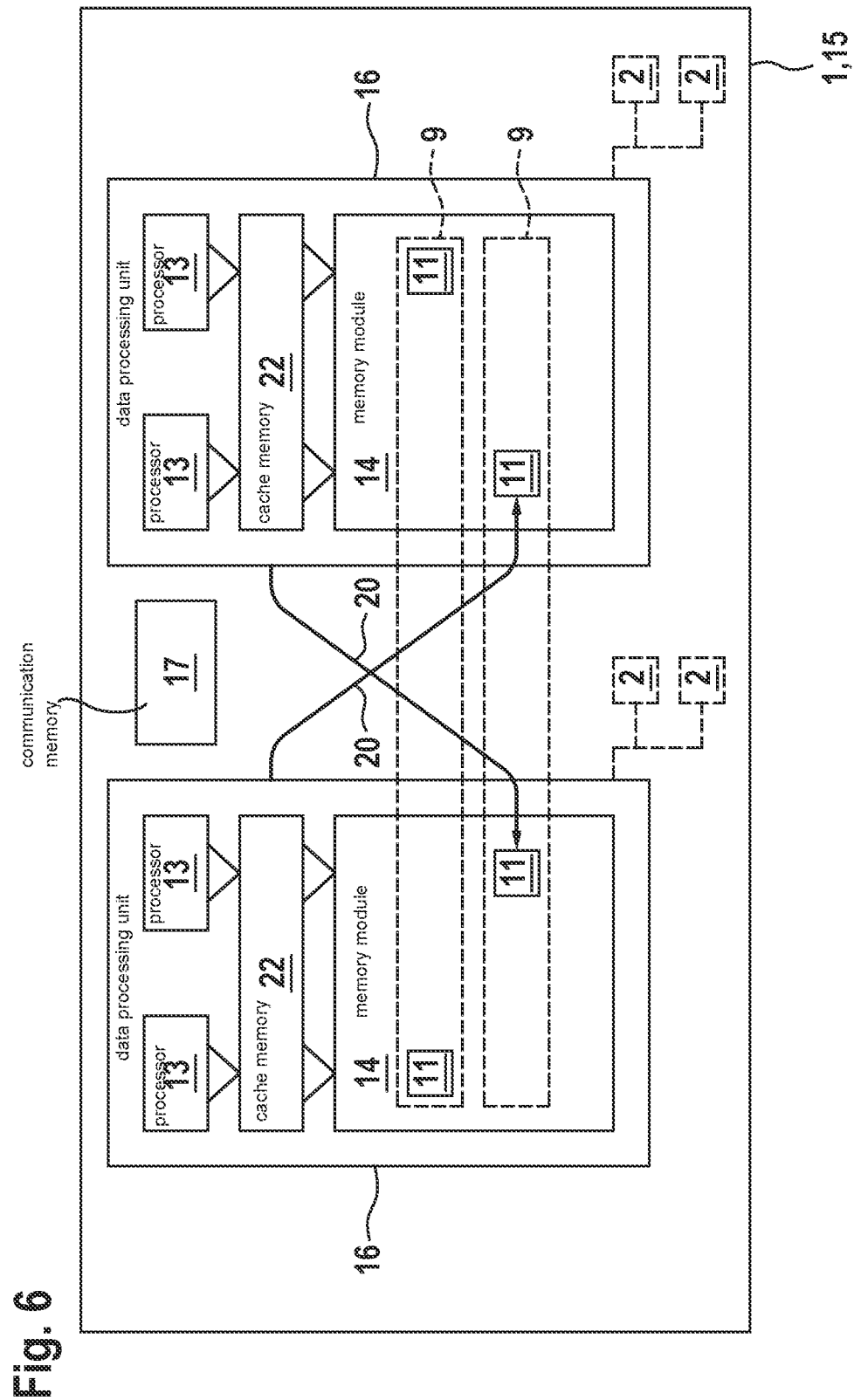
FIG. 6 shows a data processing device for the described method, according to an example embodiment of the present invention.

FIG. 6 schematically shows a data processing device 15 (e.g., a SOC system) for the described method. The data processing device 15 preferably has a plurality of data processing units 16 which each have processors 13 and memory modules 14. The buffer memories 9 are reserved on the memory modules 14, with individual memory areas 11 of the buffer memories 9 being located on the different data processing units 16 or on their memory modules 14, so that the buffer memories 9 are implemented overall across the plurality of data processing units 16. The program code of the data processing modules, which are executed as data processing tasks 2, is preferably also stored on the memory modules 14. Preferably, on the data processing device 15, a higher-level controller 21 is operated which handles the distribution of the individual data processing tasks 2 to the data processing units 16. This can be done at runtime or in advance before initialization of the data processing system 1. It is shown here in sketch form that the data processing tasks 2 are "suspended" from the respective data processing units 16, or that the respective data processing units 16 are provided for performing certain data processing tasks 2.

From the point of view of the higher-level controller, the memory modules 14 and the processors 13 are to be regarded as resources that are made available for the method described. The data processing device 15 forms the data processing system 1 with the program code of the data processing modules and if appropriate also with the necessary functions of a higher-level controller 21/an operating system.

External memory accesses 20 by one data processing unit 16 to the other data processing unit 16 are shown as an example in FIG. 6. Also shown are cache memories 22 for each data processing unit 16. When data are written to the memory modules 14, in some circumstances they first reach such cache memories 22. Internal access to such data is then easily possible for the data processing unit 16 directly after the write operation, because internal access mechanisms within the data processing unit 16 check, if necessary, whether there are still data in such a cache memory 22 that are intended for storage in the memory module 14, and these data are then output (as expected). However, external memory access 20 may not yet be possible because, in particular, such internal access mechanisms (not explained in more detail here) are not available and may not be known. For this reason, the described synchronization function 19 is required to establish memory coherence from the perspective of all data processing units 16.

Preferably, when the highest-frequency task is about to be activated, the synchronization function 19 is activated first on all data processing units 16 involved. The synchronization function 19 ensures memory coherence of the individual data processing units 16. The cache memories 22 include, for example, write buffers, caches and pipelines, etc. The process carried out when performing the synchronization function 19 can also be referred to as "flushing" the memories. Preferably, the cache memory 22 is flushed as required, i.e., written to the actual data memory module 14. In general, specific memory coherence mechanisms of the individual data processing units 16 are used for this purpose as required, which will not be discussed in detail here. These include, for example, so-called fences and memory barriers and specific peripheral accesses to achieve memory coherence.

FIG. 7 shows, very schematically, a flowchart of the described method. The individual method steps a), b), c) and d) are shown, which are carried out according to the described method. When carrying out the described method, the method steps are preferably repeated regularly for each data processing task 2. This results overall in cooperation of the individual data processing tasks 2 in the data processing system 1, which results in processing of system input data (e.g., environment sensor data etc.) to form system output data (e.g., decision data for highly automated driving functions).

The invention claimed is:

1. A method for operating a data processing system for processing data, wherein the data processing system is set up for repeated execution of a plurality of data processing tasks, wherein a time grid with clock pulses is provided for execution of individual data processing tasks of the plurality of data processing tasks, a predetermined repetition rate is specified for each of the individual data processing tasks, wherein the predetermined repetition rates each define a repetition clock pulse which corresponds in each case to an integer number of clock pulses of the time grid, the repetition clock pulse of the data processing task of the individual data processing tasks with a highest repetition rate corresponds to the clock pulses of the time grid, wherein the individual data processing tasks build on one another, so that at least one of the individual data processing tasks processes output data of a further data processing task of the individual data processing tasks as input data, wherein a number of buffer memories are provided, which are assigned to the clock pulses of the time grid and are available in turn, so that output data generated during a relevant clock pulse are written to a relevant buffer memory and output data generated during previous clock pulses for a number of clock pulses are still available in other buffer memories of the buffer memories, wherein the data processing system is operated on a data processing device including at least two data processing units with processors and memory modules, wherein the individual data processing tasks are assigned to at least one of the data processing units, and memory areas of the buffer memories are made available on the memory modules of the assigned data processing units, wherein the following steps are carried out for the operation of the data processing system:
   a) executing a synchronization function in each clock pulse before the start of a relevant data processing task in order to achieve synchronization of the buffer memories for a plurality of the data processing units;
   b) executing individual data processing tasks of the plurality of data processing tasks at their specified repetition rate in the time grid on one of the data processing units of the data processing system;
   c) outputting output data by the individual data processing tasks into respectively provided memory areas of the buffer memory assigned to the clock pulse of the time grid; and
   d) reading in input data by the individual data processing tasks from respectively provided memory areas of the buffer memory which are assigned to preceding clock pulses of the time grid.

2. The method according to claim 1, wherein the output data of the individual data processing tasks are further processed as input data of further data processing tasks without a copying operation.

3. The method according to claim 1, wherein the synchronization function in step a) enables external memory accesses by data processing units of the at least two processing units to memory modules of other data processing units of the at least two processing units, in which it is ensured that all of the output data of previously executed data processing tasks are available.

4. The method according to claim 1, wherein at least one cache memory in at least one of the data processing units is emptied by the synchronization function in step a) and data contained in the at least one cache memory are stored on a memory module of the data processing unit in such a way that external memory accesses by other data processing units of the at least two processing units to the data stored on the memory module are enabled.

5. The method according to claim 1, wherein the synchronization function is in each case executed in advance of the data processing task with the highest repetition rate.

6. The method according to claim 1, wherein the synchronization function is executed for each of the data processing units.

7. The method according to claim 1, wherein the synchronization function has an execution priority corresponding to a execution priority of the data processing task with a highest priority.

8. The method according to claim 1, wherein the data processing system has a communication memory, wherein information is stored in the communication memory as to which output data are stored in which memory areas of the buffer memories.

9. The method according to claim 1, wherein for step b) a controller of the data processing system, which controller is higher-level relative to the individual data processing tasks, determines on which data processing unit of the at least two data processing units each of the individual data processing tasks is executed.

10. The method according to claim 1, wherein for step c) and d), a controller that is higher-level relative to the data processing tasks determines on which memory area of a buffer memory particular data processing tasks will store their output data so as to be capable of being read in as input data by other data processing tasks.

11. A data processing device, comprising:
at least two data processing units which each have one or more processors and one or more memory modules, wherein the data processing device is configured such that it can be operated as a data processing system, the data processing system being set up for repeated execution of a plurality of data processing tasks, wherein a time grid with clock pulses is provided for execution of individual data processing tasks of the plurality of data processing tasks, a predetermined repetition rate is specified for each of the individual data processing tasks, wherein the predetermined repetition rates each define a repetition clock pulse which corresponds in each case to an integer number of clock pulses of the time grid, the repetition clock pulse of the data processing task of the individual data processing tasks with a highest repetition rate corresponds to the clock pulses of the time grid, wherein the individual data processing tasks build on one another, so that at least one of the individual data processing tasks processes output data of a further data processing task of the individual data processing tasks as input data, wherein a number of buffer memories are provided, which are assigned to the clock pulses of the time grid and are available in turn, so that output data generated during a relevant clock pulse are written to a relevant buffer memory and output data generated during previous clock pulses for a number of clock pulses are still available in other buffer memories of the buffer memories, wherein the individual data processing tasks are assigned to at least one of the data processing units, and memory areas of the buffer memories are made available on the memory modules of the assigned data processing units, wherein the data processing system is configured to:
a) execute a synchronization function in each clock pulse before the start of a relevant data processing task in order to achieve synchronization of the buffer memories for a plurality of the data processing units;
b) execute individual data processing tasks of the plurality of data processing tasks at their specified repetition rate in the time grid on one of the data processing units of the data processing system;
c) output output data by the individual data processing tasks into respectively provided memory areas of the buffer memory assigned to the clock pulse of the time grid; and
d) read in input data by the individual data processing tasks from respectively provided memory areas of the buffer memory which are assigned to preceding clock pulses of the time grid.

12. A non-transitory computer-readable storage medium on which are stored commands for operating a data processing system for processing data, wherein the data processing system is set up for repeated execution of a plurality of data processing tasks, wherein a time grid with clock pulses is provided for execution of individual data processing tasks of the plurality of data processing tasks, a predetermined repetition rate is specified for each of the individual data processing tasks, wherein the predetermined repetition rates each define a repetition clock pulse which corresponds in each case to an integer number of clock pulses of the time grid, the repetition clock pulse of the data processing task of the individual data processing tasks with a highest repetition rate corresponds to the clock pulses of the time grid, wherein the individual data processing tasks build on one another, so that at least one of the individual data processing tasks processes output data of a further data processing task of the individual data processing tasks as input data, wherein a number of buffer memories are provided, which are assigned to the clock pulses of the time grid and are available in turn, so that output data generated during a relevant clock pulse are written to a relevant buffer memory and output data generated during previous clock pulses for a number of clock pulses are still available in other buffer memories of the buffer memories, wherein the data processing system is operated on a data processing device including at least two data processing units with processors and memory modules, wherein the individual data processing tasks are assigned to at least one of the data processing units, and memory areas of the buffer memories are made available on the memory modules of the assigned data processing units, wherein the commands, when executed by a computer, causing the computer to perform the following steps:
a) executing a synchronization function in each clock pulse before the start of a relevant data processing task in order to achieve synchronization of the buffer memories for a plurality of the data processing units;
b) executing individual data processing tasks of the plurality of data processing tasks at their specified repetition rate in the time grid on one of the data processing units of the data processing system;
c) outputting output data by the individual data processing tasks into respectively provided memory areas of the buffer memory assigned to the clock pulse of the time grid; and
d) reading in input data by the individual data processing tasks from respectively provided memory areas of the buffer memory which are assigned to preceding clock pulses of the time grid.

* * * * *